(12) United States Patent
Papendorf et al.

(10) Patent No.: US 7,344,179 B2
(45) Date of Patent: Mar. 18, 2008

(54) RETRACTABLE HARDTOP FOR A VEHICLE

(75) Inventors: Marcus Papendorf, Besigheim (DE);
Gernot Bruder, Karlsruhe (DE)

(73) Assignee: Magna Car Top Systems GmbH,
Bietigheim-Bissingen (DE)

( * ) Notice: Subject to any disclaimer, the term of this patent is extended or adjusted under 35 U.S.C. 154(b) by 0 days.

(21) Appl. No.: 11/549,231

(22) Filed: Oct. 13, 2006

(65) Prior Publication Data
US 2007/0152469 A1    Jul. 5, 2007

Related U.S. Application Data

(63) Continuation of application No. PCT/EP2005/002584, filed on Mar. 11, 2005.

(30) Foreign Application Priority Data
Apr. 16, 2004    (DE) .................... 10 2004 019 244

(51) Int. Cl.
*B60J 7/00* (2006.01)
(52) U.S. Cl. .................... 296/108; 296/107.17
(58) Field of Classification Search ........... 296/107.17, 296/108, 107.16
See application file for complete search history.

(56) References Cited

U.S. PATENT DOCUMENTS 6,592,169 B2 * 7/2003 Obendiek .............. 296/107.07

| 2001/0040385 | A1 | 11/2001 | Obendiek |
| 2002/0185886 | A1 | 12/2002 | Obendiek |
| 2003/0034667 | A1 | 2/2003 | Willard |
| 2004/0041437 | A1 | 3/2004 | Willard |
| 2004/0094987 | A1 | 5/2004 | Salz et al. |

FOREIGN PATENT DOCUMENTS

| DE | 10108493 A1 | 9/2001 |
| DE | 10163315 A1 | 7/2003 |
| DE | 10218874 A1 | 12/2003 |
| EP | 1285795 A | 2/2003 |
| WO | 03047896 A1 | 6/2003 |

OTHER PUBLICATIONS

International Search Report of International Appln. No. PCT/EP2005/002584.
English Abstract of DE10163315.

* cited by examiner

*Primary Examiner*—Joseph D. Pape
(74) *Attorney, Agent, or Firm*—Brooks Kushman P.C.

(57) ABSTRACT

Linkages of a vehicle hardtop having two main links. The two main links have link attachments to a main bearing. The link attachments are offset with respect to each other in the vehicle's longitudinal direction. The first main link is connected to the front link attachment of the main bearing. The second main link is a C-pillar link that is attached to and moves with the rear roof part of the hardtop. An intermediate link connects the second main link to the main bearing. A connection link connects the intermediate link to the first main link.

20 Claims, 5 Drawing Sheets

RETRACTABLE HARDTOP FOR A VEHICLE

CROSS REFERENCE TO RELATED APPLICATION

This application is a continuation of PCT application Ser. No. PCT/EP2005/002584 filed Mar. 11, 2005, which claims priority to German patent application 10 2004 019 244.8 filed Apr. 16, 2004, which are hereby incorporated by reference in their entirety.

BACKGROUND OF THE INVENTION

1. Field of the Invention

The invention relates to linkages for a vehicle hardtop.

2. Background Art

German published patent application DE 101 08 493 A1 discloses linkages for a three-part vehicle hardtop. Two main links support the vehicle hardtop. On a body side, the two main links are associated with a main bearing. The main bearing has a rear link attachment for the main link in the vehicle's longitudinal direction. The main link is a C-pillar link and is associated with a rear roof part. The rear link attachment is a bearing for the C-pillar link that has a stationary position relative to the body. A front link attachment includes an intermediate link. The intermediate link has a pivot point and is pivotably connected to the main link at a connection point. The pivot point has a stationary position relative to the body. A connection link acts on the intermediate link. The intermediate link is a drive link and is connected to the main link through a link drive to form the C-pillar link. The intermediate link produces a translational displacement for the main link that pivots on the intermediate link. The translational displacement depends on the position of the intermediate link when the intermediate link pivots. A first phase of opening the hardtop involves translational displacement of the hardtop by raising the hardtop near the front connection of the hardtop to the windshield.

European published patent application EP 0 974 480 A1 also discloses a main bearing in the form of a bracket for folding convertible vehicle tops that is used to support a main link. The bracket pivots with respect to the body. When the convertible top is folded up and stored in the convertible top compartment, the bracket assumes a upwardly inclined position and is raised with respect to the link attachments of the main links. The bracket that forms the main bearing is raised and the link attachments of the main links are raised with respect to the body to allow the convertible top to fold above the body when the convertible top is either closed or being folded. Folding the convertible top above the body avoids limitations associated with the body and parts of body units. For example, folding the convertible top above the body allows the convertible top to be folded into a packet, pivoted and stowed into the convertible top compartment.

German published patent application DE 102 48 350 A1 discloses a vehicle hardtop having a rear roof part and a front roof part. The front roof part lies in front of the rear roof part when the hardtop is in a closed position. The rear roof part includes a rear window and side C-pillar links. The rear window, or a frame associated with it, is adjustable relative to the C-pillar links. The C-pillar links and the rear window, or rear window frame, form linkages bearing the front roof part. Each of the linkages is connected with the body so that the front roof part can pivot through arms that project downwards towards the vehicle body. A bracket connects the linkages to the body. The bracket is longitudinally adjustable with respect to the body and has bearing positions for the arms. The arms are adjustable with respect to the bracket and are connected to the drive and each other through a coupling element. One drive per side of the vehicle is sufficient to ensure that the roof parts can pivot uniformly about the arms' bearing positions associated with the bracket. Additional longitudinal adjustment of the bracket causes the closed hardtop as a whole to be displaced far enough to disengage a pin connection without the roof parts shifting with respect to one another. Pins associated with the front roof part and pin receptacles associated with the windshield frame form the pin connection.

European patent EP 1 361 966 A discloses a convertible vehicle roof. The roof is in the form of a hardtop having two roof parts. The two roof parts shift out of their respective closed positions with an actuating force. The rear roof part, which is associated with a C-pillar link, is connected to a body side through a drive link and a support link. A driving cylinder supported on the body side may cause the drive link to operate. The support link is in the form of an elbow lever. When a force is applied to the support link through a spring element, the support link is raised from an end position. The spring element is supported on the body side at a position corresponding to the respective end position. The C-pillar link and a main link form linkages supporting the front roof part. The main link is attached to the body through an intermediate link. A coupling link operatively connects the intermediate link to the drive link.

European published patent application EP 1 285 795 A2 discloses an adjustable bracket to reduce the space required for a multi-part opening vehicle roof that is stored between a vehicle's trunk and seating space. The adjustable bracket supports the roof and a four-bar mechanism supports the adjustable bracket on the body. An actuating drive applies force to one link of the four-bar mechanism. The rear roof part is attached to the bracket to allow the rear roof part to pivot and adjust through a second actuating drive. An driving cylinder supported against the bracket forms the second actuating drive. A second four-bar mechanism links the front roof part to an arm of the bracket. The rear link of the second four-bar mechanism has, in the area of the rear link's attachment to the bracket's arm, a cantilever. A support link attached to the body acts on the cantilever to move the front roof part toward the rear roof part depending on the adjusting motion of the bracket. Movement of the front roof part towards the rear roof part independently moves the rear roof part against the bracket.

German published patent application DE 101 63 315 A1 discloses a multi-part opening roof having a space-saving storage design. The roof has a rear roof part associated with a C-pillar link. The C-pillar link is part of a four-bar mechanism and supports the front roof part with a control link positioned in front of the front roof part. The links of the four-bar mechanism are arranged on a bracket. A second four-bar mechanism arrangement connects the bracket to a body. The C-pillar link has a cantilever near the C-pillar's attachment to the bracket. An intermediate link connects the cantilever to the front link of the four-bar mechanism. The front link of the four-bar mechanism is located between the body and the bracket to allow the cantilever to pivot.

German published patent application DE 102 18 874 A1 discloses a multi-part hardtop having a rear window that is associated with a rear roof part to reduce space requirements for a roof in a storage position. When the roof is in the storage position, the roof is located in the back inside portion of the vehicle. To stow the roof, the roof is swung down toward the back inside portion of the vehicle which moves the rear window relative to the rear roof part. A four-bar arrangement supports the rear window with respect to the C-pillar link of the rear roof part. A control lever connects the four-bar arrangement to the front roof part. A second four-bar mechanism arrangement connects the front roof part to the body. The second four-bar mechanism arrangement has one link formed by the C-pillar link to allow the control lever to pivot the front roof part with respect to the rear roof part. Pivoting the front roof part moves the four-bar arrangement supporting the rear window. Pivoting the front roof part also moves the rear window both translationally and rotationally with respect to both the C-pillar link and the surrounding part of the rear roof part to allow greater packing density of the stored roof.

Applicant's invention improves on the above designs as summarized below.

SUMMARY OF THE INVENTION

One aspect of the present invention is to provide linkages for a vehicle hardtop capable of being stored in a back area of a vehicle behind a passenger compartment. The back area may be located in a trunk or in a convertible top compartment located near the trunk. A rear roof part moves in a flattened path of motion to provide sufficient clearance between the rear roof part and the vehicle body. For example, the flattened path of motion may provide sufficient clearance for rear wheel wells and other parts arranged near the rear wheel wells such as a gas tank filler neck.

In one embodiment, the linkages may include an intermediate link that attaches a C-pillar link to a main bearing to provide a flattened path of motion. The flattened path of motion allows the roof to avoid having to be lowered as deeply into the storage compartment of the convertible top relative to the C-pillar link pivot point. The C-pillar link pivot point has a fixed position relative to the body. The flattened path of motion avoids a substantial increase in the length of the path of motion of the lower rear edge of the rear roof part as measured in the vehicle's longitudinal direction.

In one embodiment of the invention, the link attachments of the main links to the main bearing may be offset in height. The main bearing point associated with the rear link attachment may be lower than the main bearing point associated with the front link attachment. The main bearing point associated with the rear link attachment may form a main bearing side pivot point for the intermediate link. The intermediate link extends from the main bearing side pivot point toward the back when the vehicle hardtop is in a closed position. The intermediate link may incline toward the back and up such that the separation of the main bearing points, when measured in the vehicle's longitudinal direction, is smaller than the separation of the main links to both the main bearing and the intermediate link. The connection link allows the main link to cooperate with the intermediate link when the driving cylinder is operational. When the hardtop is closed, the connection link extends in approximately the same direction as the main links. The main link that is associated with the front link attachment of the main bearing may be a two-armed lever. A shorter arm of the main link is remote from the hardtop and connects the main link to the connection link.

In one embodiment, the drive of the linkages is associated with the main link. The front link attachment of the main bearing connects the main link to the body side. In one example, a lever arm associated with the connection link may be used to connect the main link to the body side. The drive element may be a rotary actuator. The rotary actuator may be connected to the driven main link at a main bearing point.

Other advantages and useful embodiments are disclosed or suggested in the claims, the description of the figures, and the drawings.

DETAILED DESCRIPTION OF THE PREFERRED EMBODIMENT(S)

Figure 1:
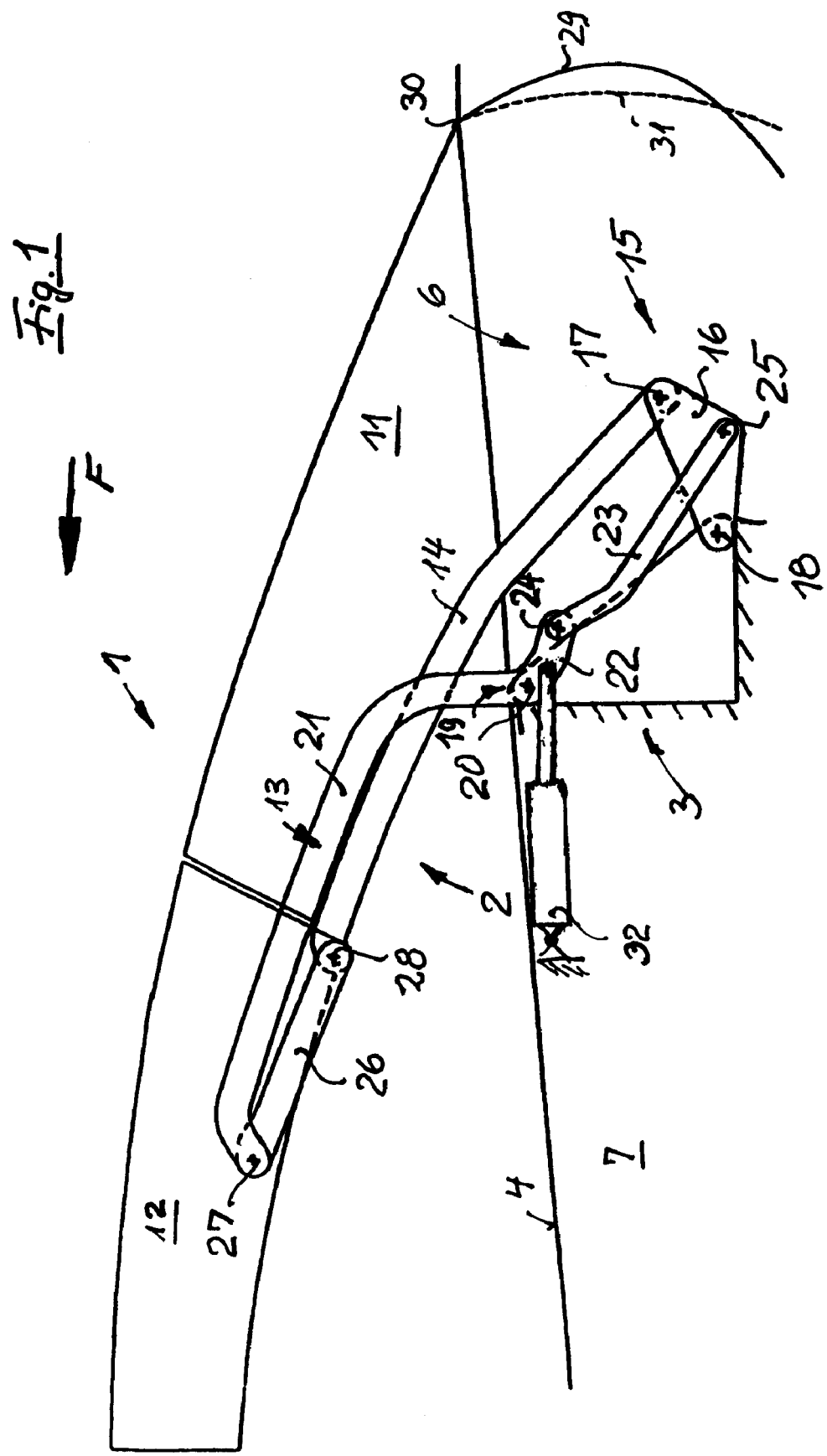
FIG. 1 is a schematic side view illustrating a hardtop in a closed position.
Figure 2:
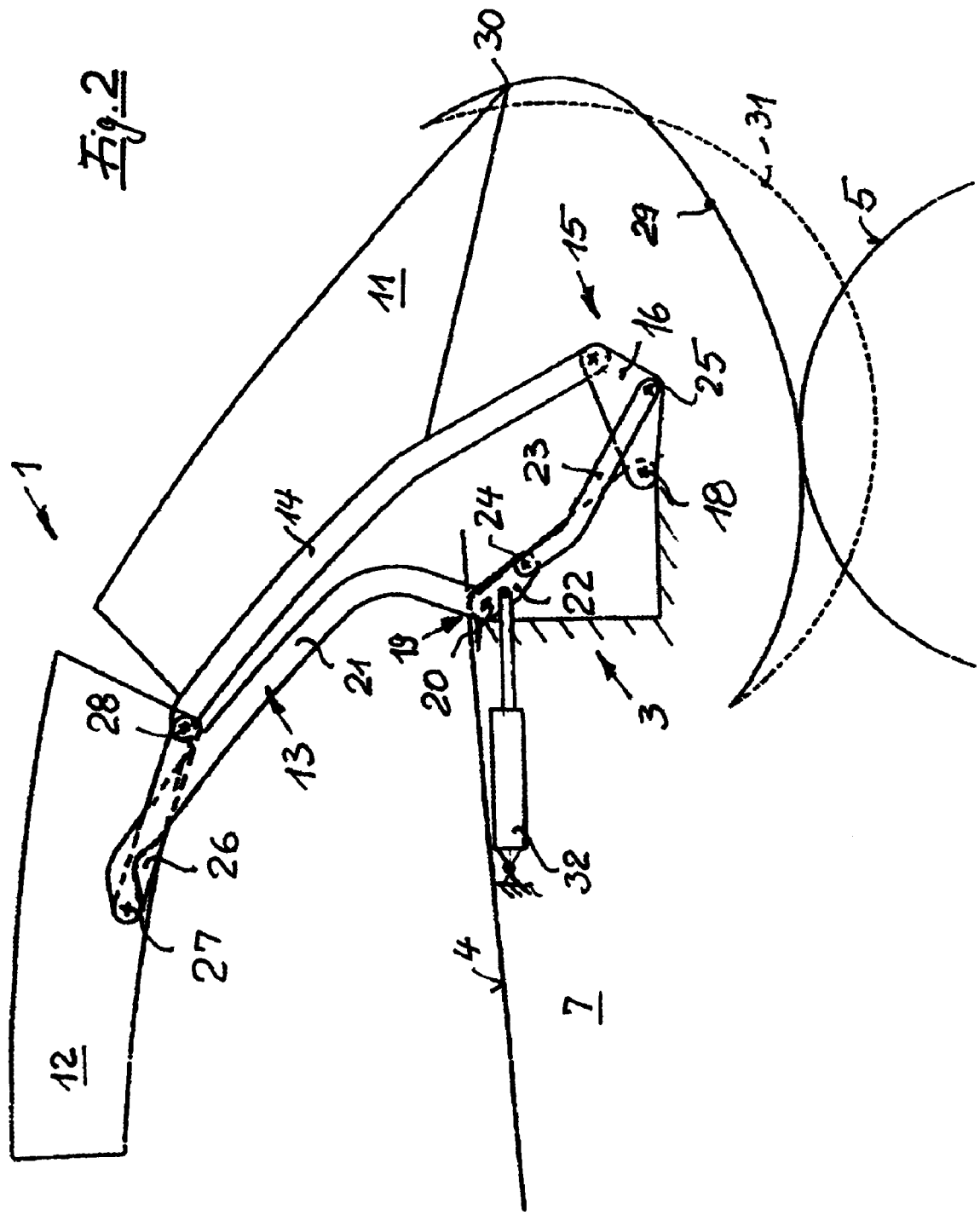
FIG. 2 is a schematic side view illustrating the hardtop opened about ten percent (10%).

FIGS. 1-5 show a schematic side view of an embodiment for part of a vehicle having an open body. A hardtop 1 is supported on linkages 2. A main bearing 3 connects the linkages 2 to the side of the vehicle body. The main bearing 3 is disposed generally below an indicated vehicle belt line 4. The main bearing 3 lies above a wheel well 5 (shown in FIGS. 2-5) near the front portion of a convertible top storage compartment 6.

Figure 5:
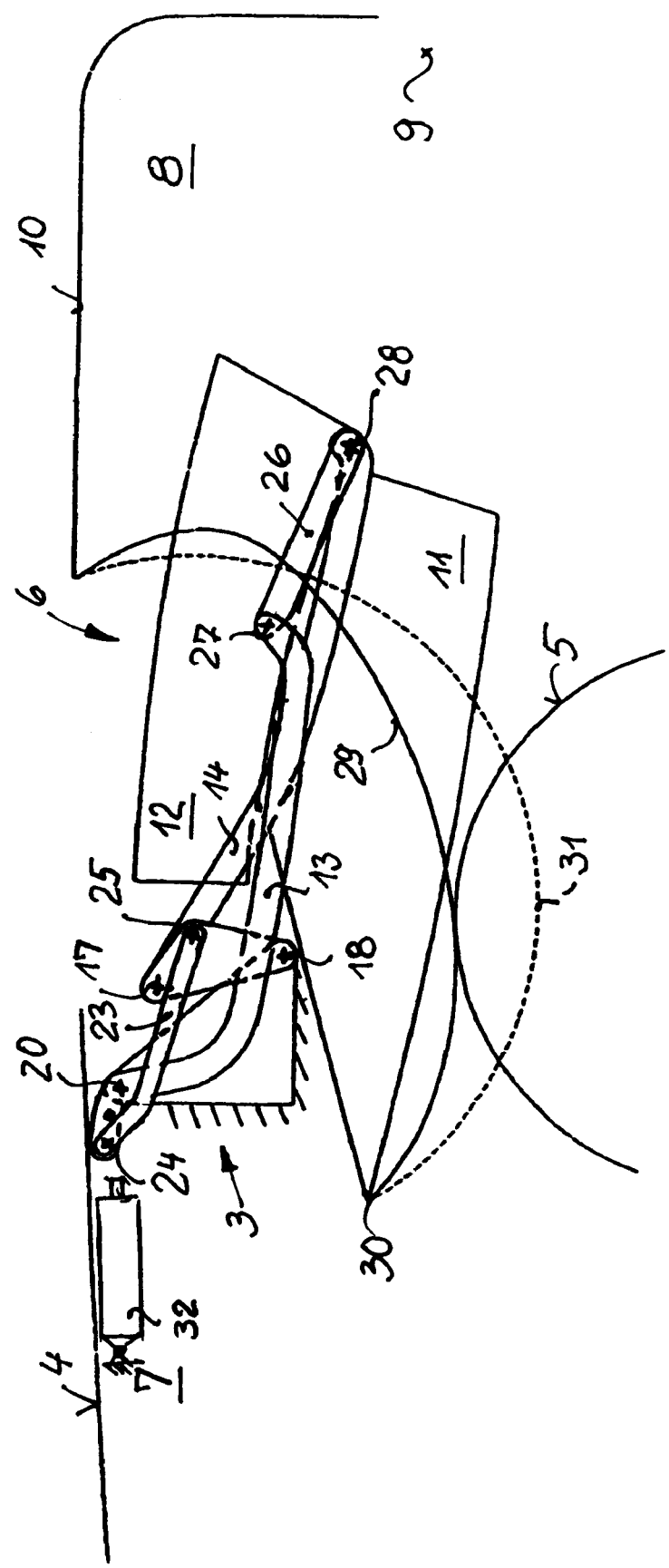
FIG. 5 is a schematic side view illustrating the hardtop in a storage position and opened about one-hundred percent (100%).

As illustrated in FIG. 5, the convertible top storage compartment 6 is located between a passenger compartment 7 and a trunk 8. The passenger compartment 7 is located in front (forwardly in the direction of travel labeled F) of the convertible top storage compartment 6. The trunk 8 is located behind the convertible top storage compartment 6. The convertible top storage compartment 6 may form a part of the trunk 8. The trunk 8 has a trunk lid 10 that pivots about a real or virtual axis of rotation 9. When the trunk lid 10 is swung up into an open position, the hardtop 1 can be either folded up into a packet and lowered into the convertible top storage compartment 6, or erected out of the convertible top storage compartment 6 to cover the passenger compartment 7 as shown in FIG. 1.

With continuing reference to FIGS. 1-5, in one embodiment, the hardtop 1 may be a two-part hardtop having a rear roof part 11 and an adjacent front roof part 12. The front roof part 12 lies in front of the rear roof part 11. The hardtop 1 may have additional roof parts (not shown) located adjacent to the front roof part 12 and connected to the front roof part 12. The front roof part 12 or adjacent roof parts (not shown) located in front of the front roof part 12 may be connected to a header of a windshield when the hardtop 1 is in a closed position. The wheel well 5 of each rear wheel well is usually symmetrical with respect to the longitudinal center plane of the vehicle. The rear roof part 11 and front roof part 12 are also symmetrical with respect to the longitudinal center plane of the vehicle. The rear roof part 11 and front roof part 12 each have essentially the same linkages 2 that are connected to the main bearing 3 for each side of the vehicle.

In one embodiment, each linkage 2 includes a first main link 13 and a second main link 14. The second main link 14 and the rear roof part 11 form a C-pillar. The second main link 14 is connected by a rear link attachment 15 to the main bearing 3. The rear link attachment 15 includes an intermediate link 16. The intermediate link 16 is pivotably connected to the second main link 14 at a first connection point 17. In addition, the intermediate link 16 is pivotably connected to a first main bearing point 18 of the main bearing 3. The first main link 13 is connected at a front link connection point 19 to the main bearing 3. The main bearing 3 has a second main bearing point 20. Both the first main bearing point 18 and the second main bearing point 20 are fixed with respect to the main bearing 3.

In one example, the second main bearing point 20 of the main bearing 3 is a fixed-position support. The first main link 13 is formed as a two-armed lever having a upper lever arm 21 and a lower lever arm 22. The lower lever arm 22 extends to a connection link 23 that connects the lower lever arm 22 to the intermediate link 16. A pivot bearing 24 is provided at a second connection point where the lower lever arm 22 is connected to the connection link 23. A pivot bearing 25 is provided at a third connection point where the connection link 23 is connected to the intermediate link 16. The bearing 24 pivotably connects the lower lever arm 22 to the connection link 23. The bearing 25 connects the connection link 23 to the intermediate link 16. A coupler 26 associated with the front roof part 12 connects the first main link 13 and the second main link 14 to the front roof part 12. The first main link 13 is attached to the coupler 26 at a first attachment point 27 and the second main link 14 is attached to the coupler 26 at a second attachment point 28.

Referring to FIG. 1, the first main link 13 and the second main link 14 generally describe approximately parallel lines relative to each other (i.e., with their body and connection-to-attachment points) when the hardtop 1 is in its closed position. More specifically, a line connecting the second main bearing point 20 and the first attachment point 27 is approximately parallel to a line connecting the first connection point 17 and the second attachment point 28. The lower lever arm 22 forms a corresponding extension line that extends in essentially the same direction as a line connecting the bearing 24 and the bearing 25 in the initial position of the lower lever arm 22 of the first main link 13.

The line connecting the bearing 24 and the bearing 25 crosses the intermediate link 16. The intermediate link 16 is in the shape of a triangle that may be roughly in the shape of an isosceles triangle having a base described by a line connecting the first connection point 17 and the first main bearing point 18. The bearing 25 lies near a rounded vertex of the triangle. The connection link 23 slopes up toward the front and forms an acute angle between the line connecting the bearing 24 and the bearing 25 and the line connecting the first main bearing point 18 and the bearing 25. The acute angle may be about 30° to 40° and, for example, may be less than 45°.

The rear roof part 11 of the hardtop 1 has a lower rear edge area 30. The lower rear edge area 30 describes either a first path of motion 29 according to a preferred embodiment of the invention which is contrasted with a second path of motion 31 corresponding to a path of motion that the lower rear edge area 30 follows if the second main link 14 is fixed relative to the main bearing 3. The first path of motion 29 is drawn as a solid line and the second path of motion 31 is drawn as a dashed line. If the main link is not fixed relative to the main bearing 3, then the lower rear edge follows the first path of motion 29. FIGS. 2-5 illustrate the first path of motion 29 avoiding the wheel well 5 and the second path of motion 31 entering into the wheel well 5. FIG. 5 shows a compact storage position of the hardtop 1 in the convertible top storage compartment 6.

Referring to FIGS. 1-5, in one embodiment, the connection link 23 pivots as the hardtop 1 opens. As the hardtop 1 opens, a line along the longitudinal direction of the connection link 23 pivots from a position associated with the hardtop 1 in the closed position as shown in FIG. 1, toward a raised position. As the line along the longitudinal direction of the connection link 23 approaches the raised position, the line crosses a line perpendicular to the line connecting the first connection point 17 and the first main bearing point 18. The point at which the lines cross moves in a direction toward the first connection point 17 of the second main link 14. Alternatively, the connection link 23 may be attached to the second main link 14 instead of to the intermediate link 16.

In certain embodiments, a drive element of the linkages 2 may include a driving cylinder 32 that moves the lower lever arm 22 of the first main link 13. Direction-changing gears (not shown) may be arranged between the lower lever arm 22 and the piston rod of the driving cylinder 32 to enhance power transmission. The driving cylinder 32 may extend in the vehicle's longitudinal direction near the belt line 4.

As shown in FIG. 1, the lower lever arm 22 may form a corresponding extension line that extends in essentially the same direction as an extension line of the connection link 23 when the hardtop 1 is in the closed position. When the hardtop 1 is in the closed position, the position of the first main link 13 is essentially the same as the position of the first main link 13 before the roof initially opens. In at least one embodiment, the lower lever arm 22 may slightly raise or slightly lower the first main link 13 and prevent the front edge of the roof from being lowered more than desired.

Rotation of the first main link 13 may cause the lower lever arm 22 to function effectively as a lever. The lower lever arm 22 rotates about the second main bearing point 20 with respect to the direction of action of the connection link 23. Movement of the connection link 23 in the direction of travel F (as shown in FIG. 1) causes the intermediate link 16 to pivot up about the first main bearing point 18.

Figure 3:
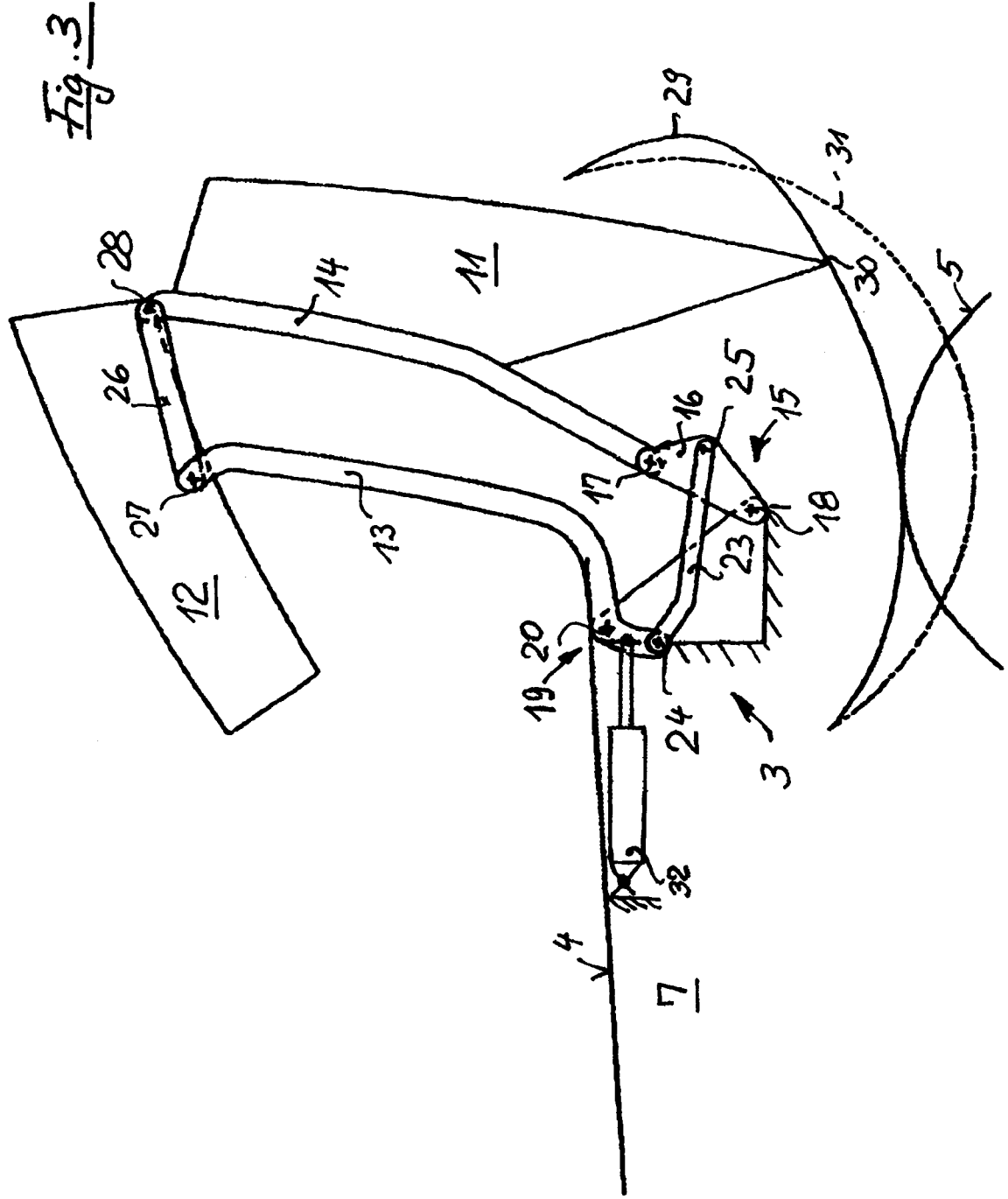
FIG. 3 is a schematic side view illustrating the hardtop opened about twenty-five percent (25%).
Figure 4:
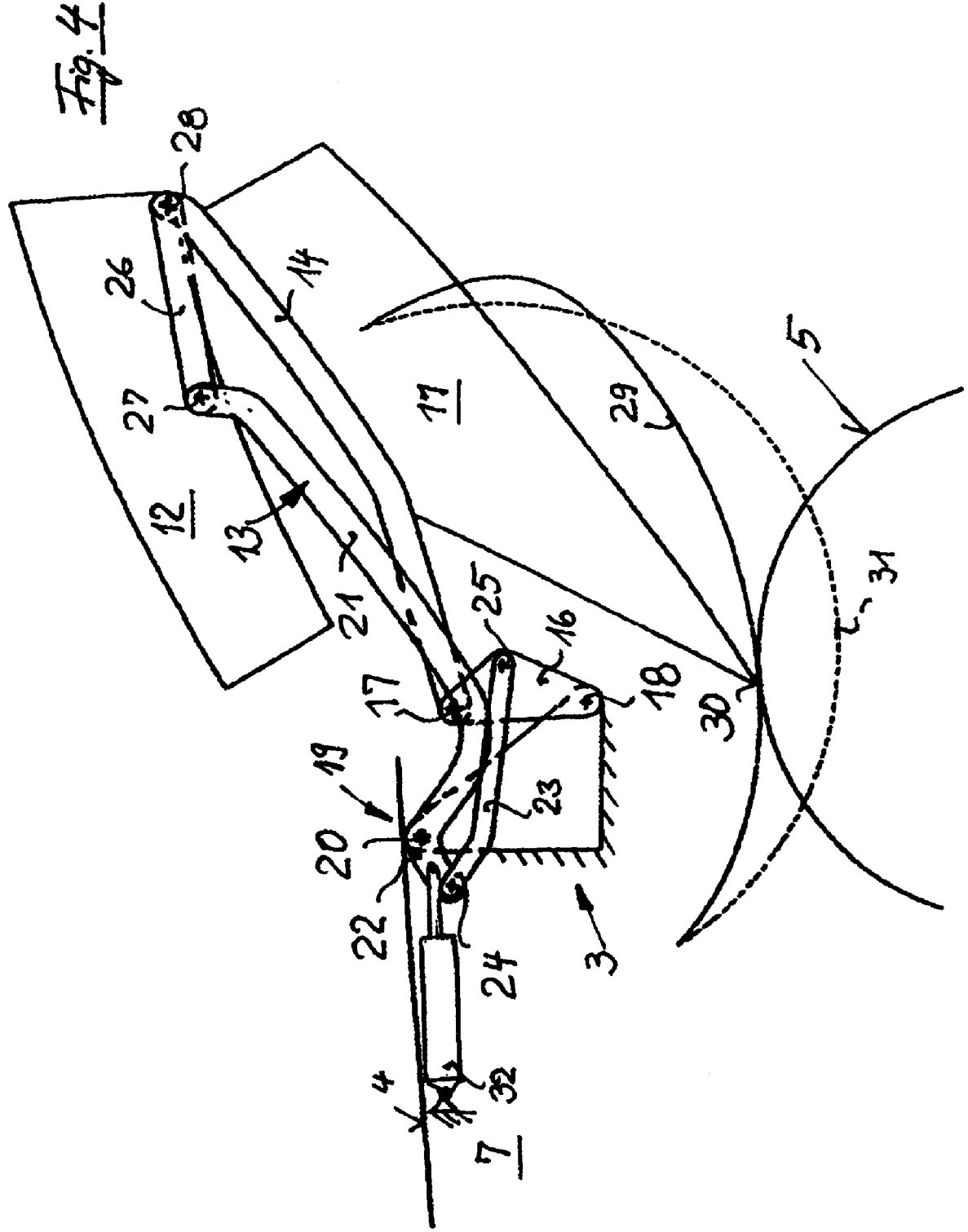
FIG. 4 is a schematic side view illustrating the hardtop opened about seventy percent (70%).

In at least one embodiment, the intermediate link 16 pivots up toward the front of the vehicle relatively quickly when the roof is initially opened (FIGS. 1-3) and relatively slowly after the intermediate link 16 is generally upright (FIGS. 3-5). The connection link 23 forms a relatively acute angle between the line connecting the bearing 24 and the bearing 25 and the line connecting the first main bearing point 18 and the bearing 25. The relatively acute angle causes the intermediate link 16 to pivot up relatively quickly initially. After the intermediate link 16 is generally upright, the elevation of the first connection point 17 changes very little because the effect of the lever of the lower lever arm 22 decreases as the relatively acute angle increases angular displacement. FIGS. 3-5 illustrate only a slight change in elevation of the first connection point 17 and the relatively acute angle increasing to an angle of on the order of about 90°. Consequently, the first connection point 17 that connects the intermediate link 16 to the second main link 14 moves slowly and mostly in the vehicle's longitudinal direction to allow a sufficient amount of time to pivot the second main link 14 above the wheel well 5.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A retractable hardtop and linkage for a vehicle, comprising:
   a rear roof part;
   at least one front roof part that is adjacent to and lying in front of the rear roof part;
   a main bearing having a rear link attachment including a first connection point, and an intermediate link having a first pivot bearing and connected at a first main bearing point to the main bearing, and a front link connection point, the rear link attachment and front link connection point are offset in the vehicle's longitudinal direction;
   a first main link having a first lever connected to the front roof part and to the front link connection point, and a second lever having a second pivot bearing disposed on an end opposite the front link connection point and being connected to the first lever at the front link connection point and operatively connected to the main bearing;
   a second main link connected to the front roof part and to the intermediate link at the first connection point and further attached to and moves with the rear roof part;
   a first connection link connected between the first main link at a first attachment point and the second main link at a second attachment point; and
   a drive operatively connected to the first main link.

2. The retractable hardtop and linkage of claim 1, wherein the rear link attachment and the front link connection point on the main bearing are offset in height.

3. The retractable hardtop and linkage of claim 2, wherein the first main bearing point is disposed lower than the front link connection point, and the front link connection point lies in front of the rear link attachment.

4. The retractable hardtop and linkage of claim 1, wherein the intermediate link extends from the first main bearing point toward the back of the vehicle when the hardtop is in a closed position.

5. The retractable hardtop and linkage of claim 4, wherein a line connecting the first connection point and the first main bearing point slopes up from the main bearing point toward the back of the vehicle when the hardtop is in the closed position.

6. The retractable hardtop and linkage of claim 4, wherein the first connection point lies lower than the front link connection point when the vehicle hardtop is in the closed position.

7. The retractable hardtop and linkage of claim 1, wherein the first connection link is approximately parallel to a first line connecting the first attachment point to the second lever and the first pivot bearing disposed forward of the first connection point when the vehicle hardtop is in closed position, and the second main link is approximately parallel to a second line connecting the first connection point and the second attachment point of the second main link to the front roof part when the vehicle hardtop is in a closed position.

8. The retractable hardtop and linkage of claim 1, wherein a first line connecting the front link connection point and the first attachment point and a second line connecting the second pivot bearing point and the first pivot bearing extend in approximately the same direction when the vehicle hardtop is in a closed position.

9. The retractable hardtop and linkage of claim 1, wherein both the second lever arm and the first connection link extend in approximately a same direction when the hardtop is in a closed position.

10. The retractable hardtop and linkage of claim 1, wherein the second lever includes a second connection link disposed between and pivotably connected to the second lever and to the intermediate link between the first connection point and the first main bearing point.

11. The retractable hardtop and linkage of claim 1, wherein the second lever includes a second connection link disposed between and pivotably connected to the second lever and the intermediate link, the second connection link pivoting at the first pivot bearing, the second connection link crossing an edge of the intermediate link opposite the pivot bearing at approximately the same elevation as the first connection point of the rear link attachment when the vehicle hardtop is in a closed position.

12. The retractable hardtop and linkage of claim 10, wherein a first line extending approximately parallel to the length of the second connection link forms an acute angle with a second line connecting the first connection point and the first pivot bearing when the hardtop is in a closed position.

13. The retractable hardtop and linkage of claim 1, wherein the intermediate link pivots in an opposite direction relative to the first main link when the hardtop is rotated between a closed position and a stored position.

14. A retractable hardtop and linkage for a vehicle comprising:
   a rear roof part having a lower rear edge area;
   a front roof part adjacent to the rear roof part and disposed opposite the lower rear edge area and towards the front of the vehicle when in a closed position;
   a main bearing secured to the vehicle and disposed below the rear roof part when the rear roof part is in a closed position;
   a four-bar linkage including a first main link and second main link that are operatively connected by a base link, the base link is pivotably secured to the main bearing, and wherein a coupler is pivotably connected between the first and second main links and is also connected to the front roof part; and
   a driving cylinder is operatively connected at a first end to the first main link and at a second end to the vehicle, wherein the lower rear edge area of the roof part traverses a flattened path of motion when the driving cylinder drives the retractable hardtop and linkage between the closed position and an open position.

15. The retractable hardtop and linkage of claim 14, wherein the main link includes an upper lever and a lower lever pivotably connected together, the upper lever being longer than the lower lever, the lower lever being operatively connected to the base link, the upper lever being pivotably connected to the coupler.

16. The retractable hardtop and linkage of claim 14, wherein the base link includes an intermediate link and a connection link, the intermediate link being pivotably connected at a first end to the second main link and a second end to the main bearing, the connection link being pivotably attached at a first end to the intermediate link at a pivot bearing disposed between the ends of the intermediate link and at a second end to the first main link.

17. The retractable hardtop and linkage of claim 14, wherein the base link consists essentially of an intermediate and a connection link, the connection link pivotably attached at a first end to the intermediate link and at a second end to the first main link, the intermediate link being pivotably connected at a first end to the second main link and at a second end to the main bearing, the connection link being pivotably attached at a first end to the intermediate link at a pivot bearing disposed between the ends of the intermediate link and at a second end to the first main link.

18. A retractable hardtop and linkage for a vehicle comprising:
- a main bearing secured to the vehicle;
- a roof having a rear part and a front part, the front part being disposed forward of the rear part when in a closed position, the front part pivoting to be disposed above the rear part in an open position, the rear part having a lower rear edge opposite the front part;
- a driven four-bar linkage consisting essentially of the main bearing, a first main link having a first end pivotably connected to the front roof part and a second end, the first main link being pivotably attached to the main bearing at a bearing point disposed between the first and second end, a second main link having a first end pivotably connected to the front roof part and a second end pivotably connected to an intermediate link, the intermediate link being pivotably connected to the main bearing, and a coupler pivotably connected between the first and second main links; and
- a drive secured to the vehicle and pivotably connected to the first main link between the bearing point and the second end of the first main link, the drive and driven four-bar linkage are adapted to move the lower rear edge of the rear roof part in a flattened path of motion when moving between the closed and the open position.

19. The retractable hardtop and linkage of claim 18, wherein the driven four-bar linkage further comprises a connection link between the first main link and the intermediate link, the connection link including a first pivot bearing connected to the main link and a second pivot bearing connected to the intermediate link.

20. The retractable hardtop and linkage of claim 18, wherein the front part of the roof is disposed below the elevation of the bearing point of the first main link when in the open position.

* * * * *